(12) United States Patent
Padilla et al.

(10) Patent No.: US 9,021,305 B2
(45) Date of Patent: *Apr. 28, 2015

(54) PROCESSING MAIN CAUSE ERRORS AND SYMPATHETIC ERRORS IN DEVICES IN A SYSTEM

(71) Applicant: International Business Machines Corporation, Armonk, NY (US)

(72) Inventors: Ricardo S. Padilla, Tucson, AZ (US); Todd C. Sorenson, Tucson, AZ (US); David V. Valverde, Tucson, AZ (US); Wang Ping He, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 13/654,331

(22) Filed: Oct. 17, 2012

(65) Prior Publication Data

US 2014/0108852 A1  Apr. 17, 2014

(51) Int. Cl.
*G06F 11/00* (2006.01)
*G06F 11/07* (2006.01)
*G06F 11/16* (2006.01)

(52) U.S. Cl.
CPC ............ *G06F 11/16* (2013.01); *G06F 11/0706* (2013.01); *G06F 11/079* (2013.01)

(58) Field of Classification Search
CPC ............ G06F 11/0772; G06F 11/0775; G06F 11/079; G06F 11/30; G06F 11/3006; G06F 11/302; G06F 11/3048; G06F 11/3055; G06F 11/3065; G06F 11/3089
USPC .......................... 714/26, 37, 38.1, 38.14, 47.1
See application file for complete search history.

(56) References Cited

U.S. PATENT DOCUMENTS

| 5,877,861 | A | 3/1999 | Ausschnitt et al. |
| 7,176,792 | B2 * | 2/2007 | Pereira et al. ................ 340/506 |

(Continued)

FOREIGN PATENT DOCUMENTS

| DE | 010043948 A1 | 3/2002 |
| DE | 102006046399 A | 4/2008 |

(Continued)

OTHER PUBLICATIONS

Boyd et al; "On Detecting Errors in Dependency Treebanks", pp. 113-137 (2008).
Preliminary Amendment filed Nov. 1, 2013, pp. 6, for U.S. Appl. No. 14/070,400, filed Nov. 1, 2013.

(Continued)

*Primary Examiner* — Scott Baderman
*Assistant Examiner* — Joseph Kudirka
(74) *Attorney, Agent, or Firm* — David W. Victor; Konrad Raynes Davda & Victor LLP

(57) ABSTRACT

Provided are a computer program product, system, and method for processing main cause errors and sympathetic errors in devices in a system. Error data for the devices in the system are analyzed to determine a main cause error for one of the devices that cause at least one sympathetic error in the system. A main cause event object for the determined main cause error and at least one sympathetic event object for the determined at least one sympathetic error resulting from the main cause error are generated. A determination is made from the at least one sympathetic event object of at least one sympathetic event action to perform. The determined at least one sympathetic event action is performed to recover from the at least one sympathetic error represented by the at least one sympathetic event object providing the at least one sympathetic event action.

24 Claims, 6 Drawing Sheets

(56) References Cited

U.S. PATENT DOCUMENTS

| | | | |
|---|---|---|---|
| 7,379,846 B1* | 5/2008 | Williams et al. | 702/185 |
| 7,937,623 B2* | 5/2011 | Ramacher et al. | 714/37 |
| 7,958,407 B2* | 6/2011 | Underdal et al. | 714/57 |
| 2007/0053445 A1 | 3/2007 | Schaar et al. | |
| 2009/0089645 A1 | 4/2009 | Cideciyan et al. | |
| 2009/0210745 A1 | 8/2009 | Becker et al. | |
| 2010/0138694 A1* | 6/2010 | Harrison et al. | 714/26 |
| 2011/0099428 A1 | 4/2011 | Stenberg et al. | |
| 2011/0115649 A1* | 5/2011 | Smith et al. | 340/963 |
| 2012/0159243 A1 | 6/2012 | Havewala et al. | |
| 2012/0166036 A1 | 6/2012 | Dyrbusch et al. | |
| 2014/0108853 A1 | 4/2014 | Padilla et al. | |

FOREIGN PATENT DOCUMENTS

| | | |
|---|---|---|
| DE | 102008000669 A | 9/2009 |
| WO | 2011000876 | 1/2011 |

OTHER PUBLICATIONS

Office Action dated Aug. 11, 2014, pp. 44, for U.S. Appl. No. 14/070,400, filed Nov. 1, 2013.

Response dated Nov. 10, 2014, pp. 13, to Office Action dated Aug. 11, 2014, pp. 44, for U.S. Appl. No. 14/070,400, filed Nov. 1, 2013.

Notice of Allowance dated Dec. 31, 2014, pp. 17, for U.S. Appl. No. 14/070,400, filed Nov. 1, 2013.

\* cited by examiner

PROCESSING MAIN CAUSE ERRORS AND SYMPATHETIC ERRORS IN DEVICES IN A SYSTEM

BACKGROUND OF THE INVENTION

1. Field of the Invention

The present invention relates to a computer program product, system, and method for processing main cause errors and sympathetic errors in devices in a system.

2. Description of the Related Art

Devices in a computer system or devices shared by multiple nodes in a system may generate errors. Errors are detected and processed. A main cause error resulting from a device in a system, such as an adaptor, memory or other component, may cause sympathetic errors in the same or different devices. For instance, a main cause error may comprise a power source failure and sympathetic errors may comprise the errors in the system that result from that power source failure.

Prior art error handling algorithms gather data to analyze the errors from the affected resource to determine the resource that caused the problem and then set an event against the resource to take recovery actions against the isolated resource. The prior art error handling algorithm may check for detected errors according to an order, such as higher priority errors first, and then perform a series of if-else statements to identify and isolate the errors to determine error recovery operations to perform.

SUMMARY

Provided are a computer program product, system, and method for processing main cause errors and sympathetic errors in devices in a system. Error data for the devices in the system are analyzed to determine a main cause error for one of the devices that cause at least one sympathetic error in the system. A main cause event object for the determined main cause error and at least one sympathetic event object for the determined at least one sympathetic error resulting from the main cause error are generated. The at least one sympathetic event object indicates a sympathetic event action to perform for the sympathetic error represented by the sympathetic event object. A determination is made from the at least one sympathetic event object of at least one sympathetic event action to perform for the determined at least one sympathetic event. The determined at least one sympathetic event action is performed to recover from the at least one sympathetic error represented by the at least one sympathetic event object providing the at least one sympathetic event action.

DETAILED DESCRIPTION

Prior art techniques for processing errors may take into account main cause errors and initiate error recovery of the main cause error without handling sympathetic errors resulting from the main cause error, especially where the sympathetic error effects a device other than the device that produced the main cause error. The error handling with respect to the main cause error and device producing the main cause error will not address the sympathetic errors that occur on other devices.

Described embodiments provide techniques for generating specific event objects for main cause errors and sympathetic errors for devices to allow specific error handling with respect to the main cause error as well as sympathetic errors. Further, described embodiments allow a main cause error to remain persistent in the system in which the error occurred and other systems so that sympathetic errors on any system resulting from the main cause error can be processed as sympathetic errors of the main cause error and handled accordingly.

Figure 1:
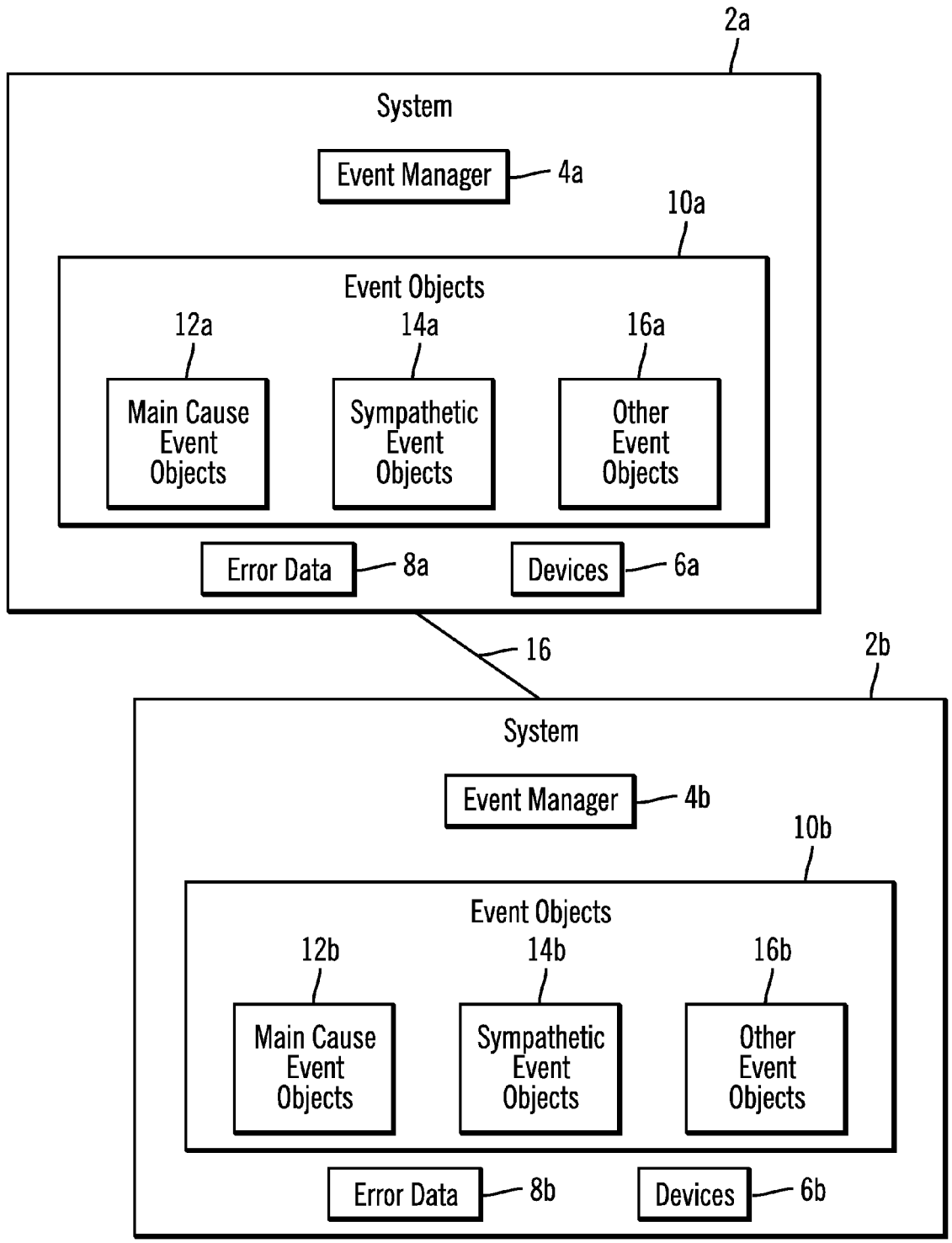
FIG. 1 illustrates an embodiment of a computing environment.

FIG. 1 illustrates an embodiment of systems 2a, 2b each having an event manager 4a, 4b to manage events related to errors detected at devices 6a, 6b in the system 2a, 2b. The devices 6a, 6b may comprise network adaptors, storage adaptors, storage controllers, memory devices, storage devices, etc., managed through the system 2a, 2b. The event manager 4a, 4b processes error data 8a, 8b comprising information on errors generated at the devices 6a, 6b and generates event objects 10a, 10b representing the errors. An event object comprises a code object including information and function calls to handle the specific error for which it was generated.

The generated event objects 10a, 10b include main cause event objects 12a, 12b for main cause errors resulting form the devices 6a, 6b and sympathetic event objects 14a, 14b for sympathetic errors resulting from one of the identified main cause errors. Sympathetic errors may occur at the device having the main cause error or external to the device having the main cause error, such as at partner devices or children devices or in remote systems from the system including the device producing the main cause error, or other devices. The event objects 10a, 10b further include other event objects 16a, 16b representing errors that could not be classified as main cause errors or sympathetic errors, which may be processed as stand alone errors.

The systems 2a, 2b may communicate over a connection 16, which may comprise a network or a direct connection, such as a cable, bus or other interconnect. Each system 2a or 2b may be described as remote with respect to the other 2b or 2a. The systems 2a, 2b may comprise nodes in a dual node cluster, such as nodes in a central electronic complex (CEC) that communicate through a bus.

Figure 2:
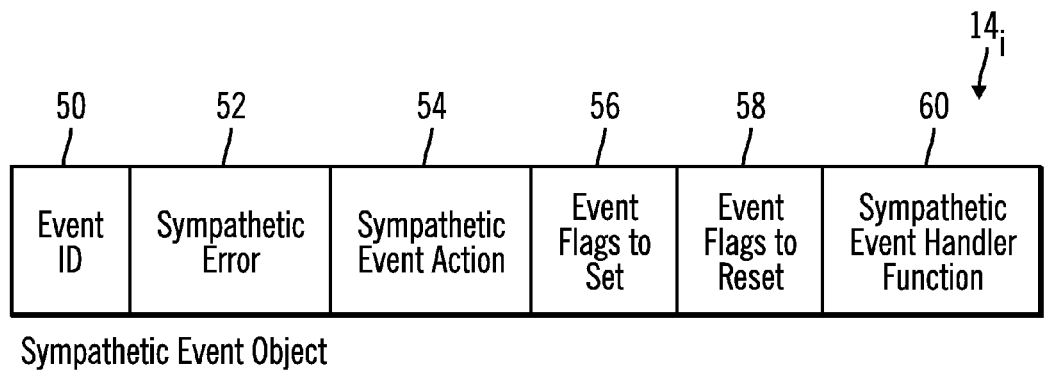
FIG. 2 illustrates an embodiment of a sympathetic event object for a sympathetic error of a main cause error.

FIG. 2 illustrates an instance of a sympathetic event object 14$_i$ representing one sympathetic error, which may indicate an event identifier 50; a sympathetic error 52 for which the sympathetic event object 50 is generated; a sympathetic event action 54 to perform, e.g., cancel or modify, to recover from the sympathetic error 52; event flags to set 56, such as no log, no recovery, no count increment, etc.; event flags to reset 58 for the sympathetic error 52; and a sympathetic event handler function 60 comprising a pointer to a function called for this detected sympathetic error 52 to perform additional actions.

If the sympathetic event action 54 indicates to modify, as opposed to cancel, then actions may be specified in fields 56, 58, and/or 60 to implement the modify action. A cancel action is indicated if there is no additional handling for the sympathetic error 52 and that it may be cleared without further action in the system 2.

Figure 3:
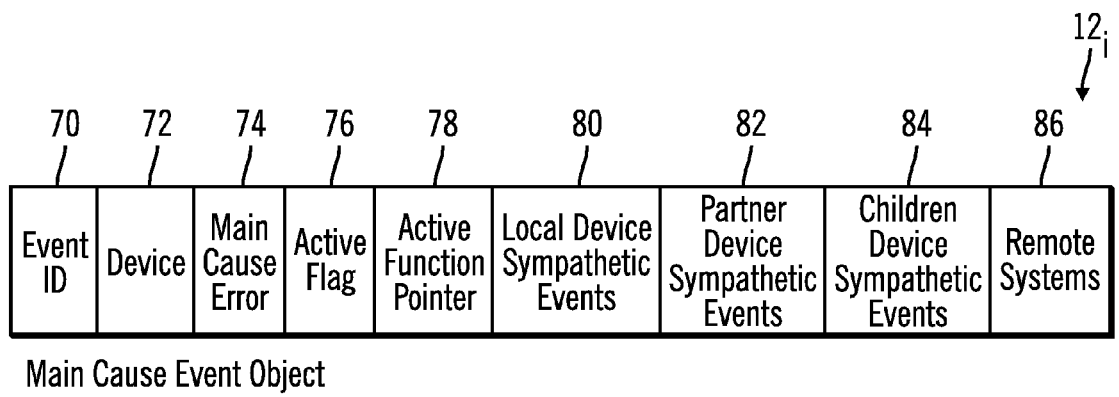
FIG. 3 illustrates an embodiment of a main cause event object.

FIG. 3 illustrates an instance of a main cause event object $12_i$, for one main cause error, including: an event ID 70; a device 72 causing the main cause error; the main cause error 74 represented by the main cause event object; an active flag 76 indicating whether the main cause error represented by the main cause event object 70 is active or inactive/cleared; an active function pointer 78 to a program to determine if the main cause error 74 is active, which may check device 72 and system 2a, 2b settings; local device sympathetic events 80 comprising a list of sympathetic event objects $14_i$ representing sympathetic errors caused or related to the main cause error 74 that are at the device 72 causing the main cause error 74; partner device sympathetic events 82 comprising a list of sympathetic event objects $14_i$ representing sympathetic errors caused or related to the main cause error 74 at a partner device of the device 72 causing the main cause error 74; children device sympathetic events 84 comprising a list of sympathetic event objects $14_i$ representing sympathetic errors caused or related to the main cause error 74 at a child device of the device 72 causing the main cause error 74; and remote systems 86 (if any) to which information on the main cause error 72 event is transmitted.

A partner device may comprise a device that provides redundancy to the device producing the main cause error and a child device may comprise a device that operates in a relation or under control of the device experiencing the main cause event.

FIGS. 2 and 3 show by way of example certain fields and information included in the sympathetic event objects $14_i$ and main cause event objects $12_i$. In further embodiments, additional, less, and different information may be included in these objects.

Figure 4:
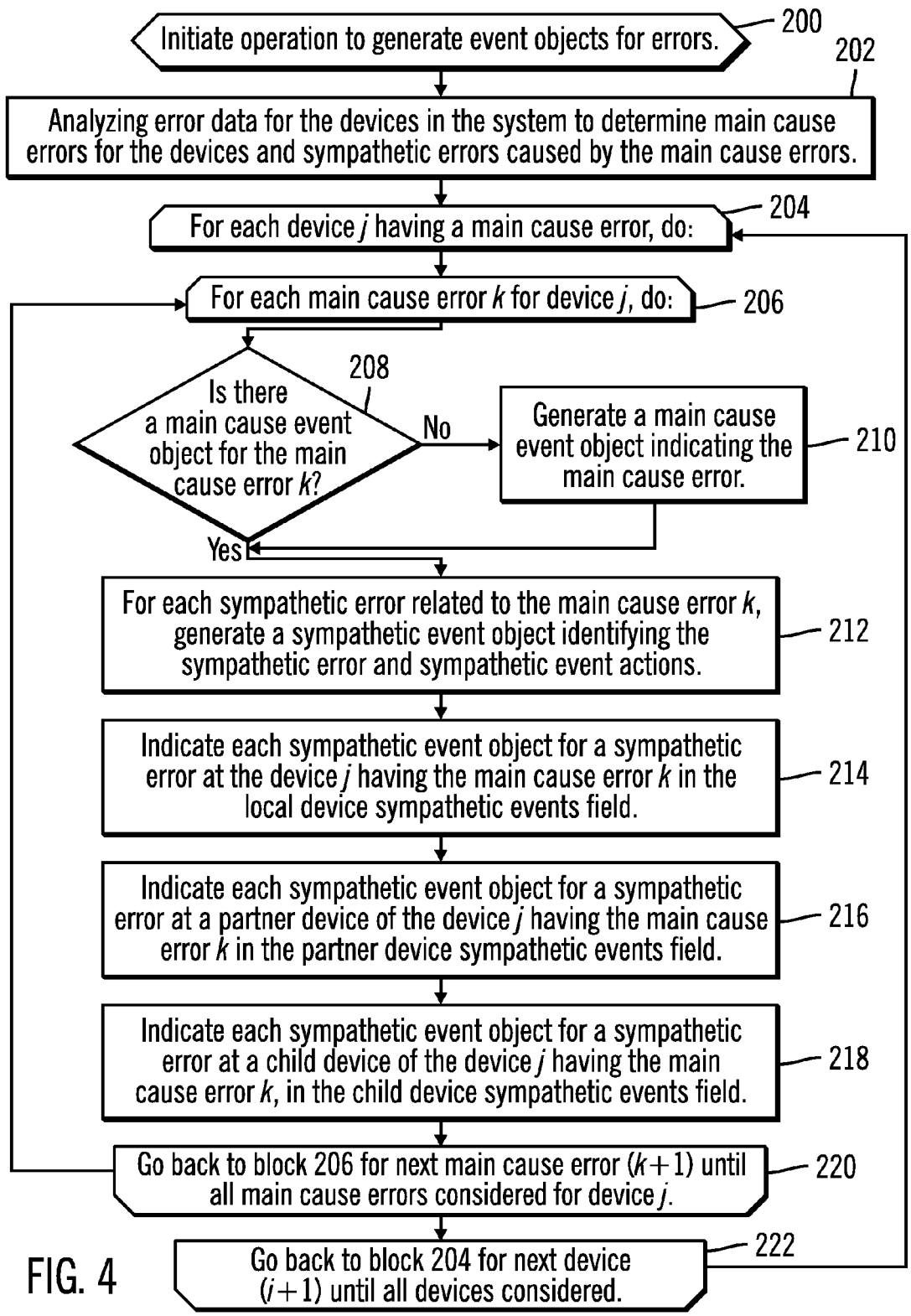
FIG. 4 illustrates an embodiment of operations to generate event objects for errors.

FIG. 4 illustrates an embodiment of operations performed by the event manager 4a, 4b to generate event objects for detected errors at devices 6a, 6b in the systems 2a, 2b. Upon initiating (at block 202) the operation to generate the event objects 10a, 10b, the event manager 4a, 4b may analyze (at block 202) error data 8a, 8b for the devices 6a, 6b in the system 2a, 2b to determine main cause errors and sympathetic errors resulting form the main cause errors, as well as to other error types. For each device j having one or more main cause errors (at blocks 204 through 220), the operations at blocks 206 through 218 are performed for each main cause error k for a device j. If (at block 208) there is no main cause event object 208 for the detected main cause error k in the error data 8a, 8b, then the event manager 4a, 4b generates (at block 210) a main cause event object 12i indicating the main cause error k in main cause error field 74 and indicating the error as active 76. In this way, a main cause error remains persistent in the system in a main cause event object 12i. After generating the main cause event object 12i (from block 210) or if there is already a main cause event object 12i for a previously detected and processed active main cause error k, then for each detected sympathetic error in the error data 8a, 8b related to or resulting from the main cause error k, the event manager 4a, 4b generates (at block 212) a sympathetic event object 14i identifying the sympathetic error 52 and sympathetic event actions 54, 56, 58, and 60 to perform to clear the error. Alternatively, the sympathetic event action 54 may indicate to clear the sympathetic error 52 without further action.

The event manager 4a, 4b indicates (at block 214) each sympathetic event object 14i for a sympathetic error at the device j having the main cause error k in the local device sympathetic events field 80. The events manager 4a, 4b indicates (at block 216) each sympathetic event object $14_i$ for a sympathetic error at a partner device of the device j, having the main cause error k, in the partner device sympathetic events field 82. The events manager 4a, 4b further indicates (at block 218) each sympathetic event object $14_i$ for a sympathetic error at a child device of the device j, having the main cause error k, in the children device sympathetic events field 84. In this way, the main cause event object 12i indicates related sympathetic event objects for sympathetic errors at the device 6a, 6b which caused the main cause error and at partner and children devices to the device causing the main cause error. This allows for fined grain control and classification of sympathetic errors in relation to the device 6a, 6b that caused the main cause error. Further, certain of the fields 80, 82, or 84 may indicate no sympathetic event objects if there are none of those type of objects.

A main cause error object 12i persistently indicates whether the main cause error 74 is active, so that if subsequent sympathetic errors resulting from or related to the main cause error 74 are detected, those subsequent sympathetic errors may be indicated in the main cause event object 12i for the main cause error of the sympathetic error. The indication of whether a main cause error is active may be indicated in a field or parameter external to the man cause event object representing the main cause error.

Figure 5:
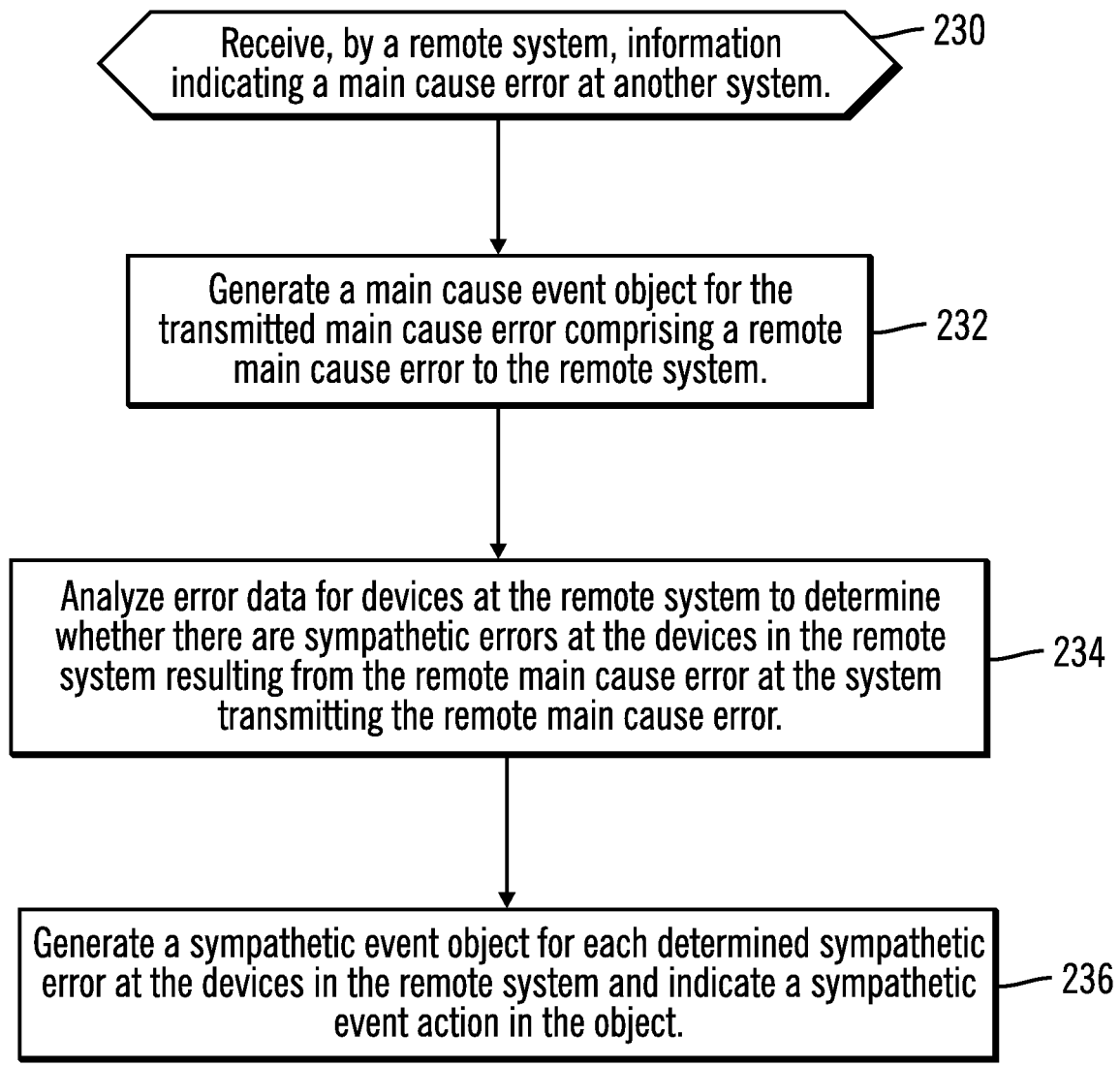
FIG. 5 illustrates an embodiment of operations to process a main cause error transmitted by a system to a remote system.

FIG. 5 illustrates an embodiment of operations performed by the event manager 4a, 4b in a remote system 2a, 2b that received information on a main cause error transmitted from another system 2a, 2b. This occurs because the main cause error on one device may cause sympathetic errors on the remote system which are to be addressed. Upon receiving (at block 230) information indicating the main cause error, the event manager 4a, 4b generates, at the remote system 2a, 2b, a main cause event object $12_i$ for the transmitted main cause error, comprising a remote main cause error to the remote system 2a, 2b. The event manager 4a, 4b may analyze (at block 234) error data 8a, 8b for devices 6a, 6b at the remote system 2a, 2b to determine whether there are sympathetic errors at the devices in the remote system resulting from the remote main cause error at the system transmitting the remote main cause error. The event manger 4a, 4b at the remote system 2a, 2b generates (at block 236) a sympathetic event object $14_i$ for each determined sympathetic error at the devices 6a, 6b in the remote system 2a, 2b, and indicate sympathetic event actions 54, 56, 58 and/or 60 in the sympathetic event object $14_i$.

Figure 6:
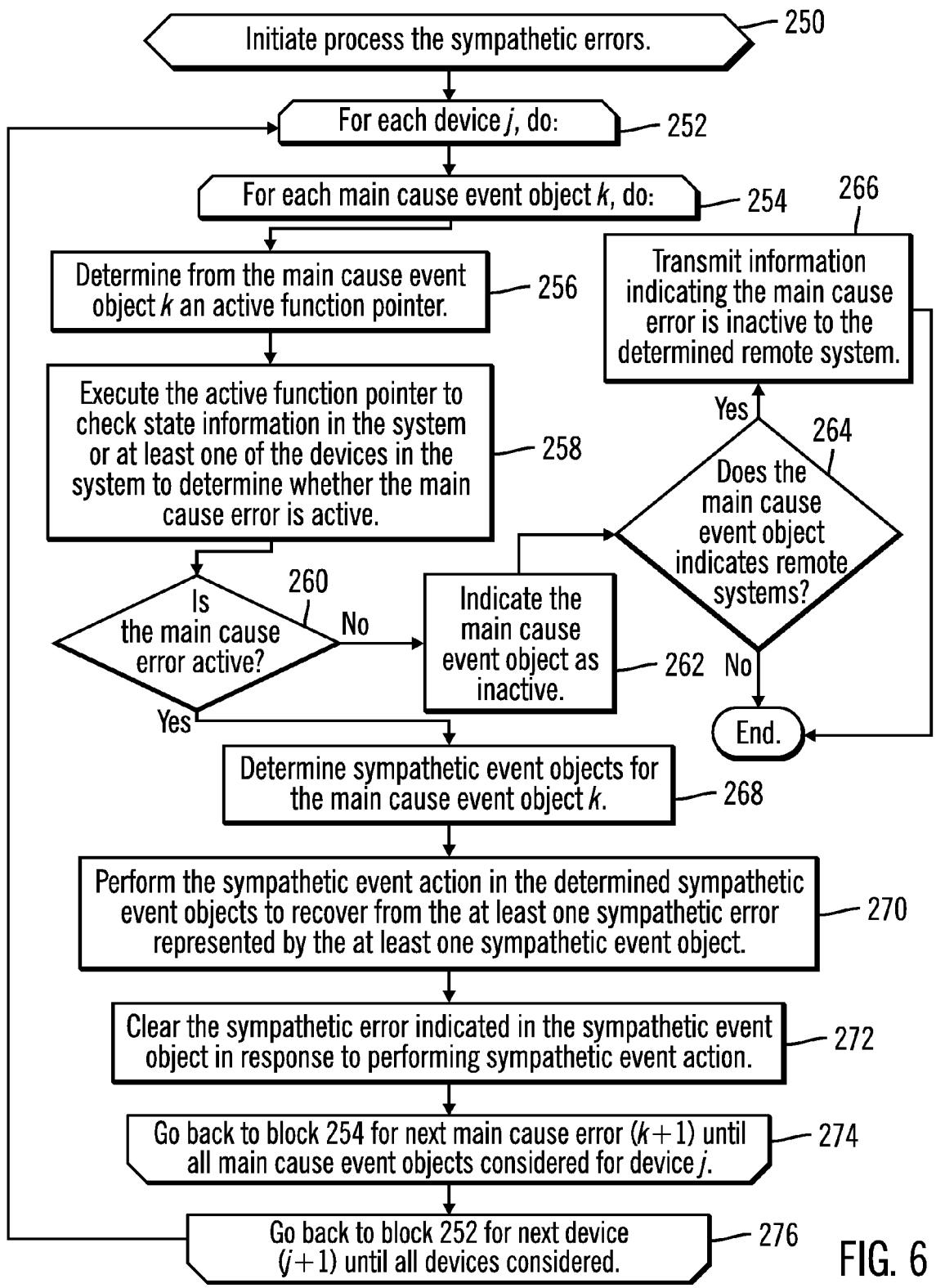
FIG. 6 illustrates an embodiment of operations to process sympathetic errors.

FIG. 6 illustrates an embodiment of operations performed by the event managers 4a, 4b to process sympathetic errors. Upon initiating (at block 250) the operation, the event manager 4a, 4b performs a loop of operations at blocks 252 through 274 for each device j of the devices 6a, 6b. For each main cause event object k for a device j, the event manager 4a, 4b performs the loop of operations at blocks 254 to 276. The main cause event object k is determined from the event objects 10a, 10b for the device j (at block 256) and the active function pointer 78 indicated in the object k is executed (at block 258). The active function pointer 78 checks state information in the system 2a, 2b or at least one of the devices 6a, 6b in the system to determine whether the main cause error represented by the main cause event object k is active. If (at block 260) the main cause error is not active, then the main cause event object k is indicated (at block 262) as inactive in field 76. If (at block 264) the main cause event object k specifies one or more remote systems 86, then the event manager 4a, 4b transmits (at block 266) information indicating the inactive main cause error to the determined remote system so that remote system 2a, 2b may indicate a remote main cause error as inactive so that further sympathetic event objects are not generated for sympathetic errors related to the inactive remote main cause errors. From blocks 264 or 266, control ends because the main error is active, which may indicate that all sympathetic errors have been processed and cleared.

If (from the yes branch of block 260) the main cause error for main cause event object k is active, then the event manager 4a, 4b determines (at block 268) sympathetic event objects 14i for the main cause event object k, which may be indicated in the sympathetic event object fields 80, 82, 84 of the main cause event object k. The event manager 4a, 4b performs (at block 270) the sympathetic event actions 54, 56, 58, and/or 60 in the determined sympathetic event objects to recover from the sympathetic errors represented by the sympathetic event objects. The sympathetic event actions performed may be to only clear the sympathetic error or modify the error by setting event flags indicated in field 56, resetting event flags indicated in field 58 and/or executing a sympathetic event handler function 60 to perform further sympathetic event action handling. The event manager 4a, 4b may then clear (at block 272) the sympathetic error indicated in the processed sympathetic event object 14i, such as by removing the sympathetic event object 14i.

After all the sympathetic errors for a main cause error are cleared, then the main cause error may be indicated as inactive in the main cause event object k representing the cleared main cause error.

Described embodiments provide techniques for classifying errors as main cause errors and sympathetic errors of the main cause errors, and then generating event objects for the main cause errors and the sympathetic errors to provide specific event code to process the errors so that sympathetic errors may be specifically addressed and cleared along with the handling of the main cause error.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Reference letters i, j, and k refer to different positive integer values, and may refer to the same or different number of elements when used in different contexts.

Devices that are in communication with each other need not be in continuous communication with each other, unless expressly specified otherwise. In addition, devices that are in communication with each other may communicate directly or indirectly through one or more intermediaries.

Figure 7:
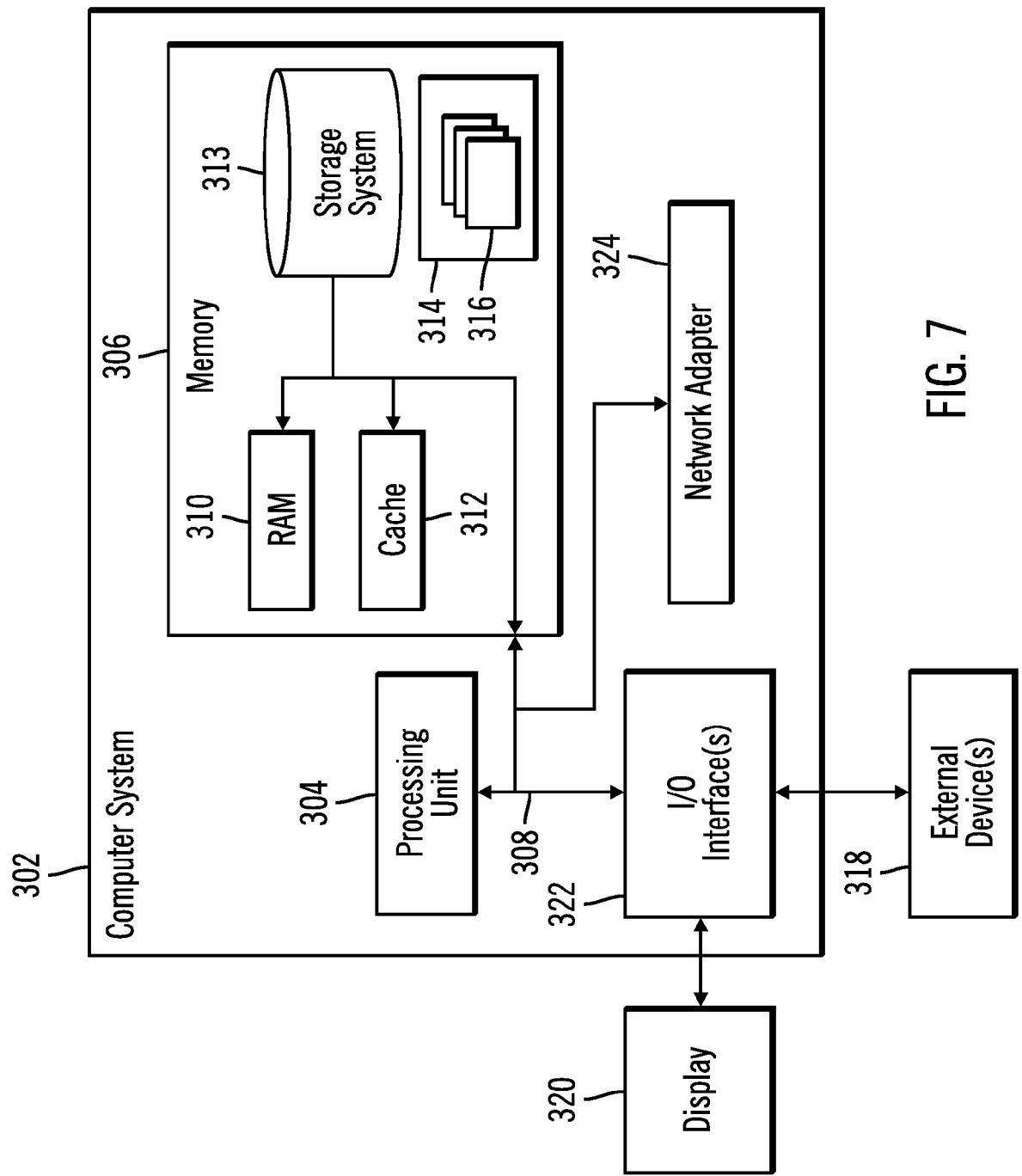
FIG. 7 illustrates an implementation of a computer system.

The systems 2a and 2b may be implemented in one or more computer systems, such as the computer system 302 shown in FIG. 7. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 316 which generally carry out the functions and/or methodologies of embodiments of the invention as described herein. The components 12, 14, 16, and 18 of the content analytics system 2 may be implemented in one or more computer systems 302, where if they are implemented in multiple computer systems 302, then the computer systems may communicate over a network.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for handling errors in a system having devices, the computer program product comprising a computer readable storage medium having computer readable program code embodied therein that executes to cause operations, the operations comprising:
    analyzing error data for the devices in the system to determine a detected main cause error for one of the devices that causes at least one sympathetic error in the system;
    generating a first main cause event object for the main cause error;
    generating at least one sympathetic event object for the determined at least one sympathetic error resulting from the main cause error, wherein the at least one sympathetic event object indicates a sympathetic event action to perform for the sympathetic error represented by the sympathetic event object;
    determining from the at least one sympathetic event object at least one sympathetic event action to perform for the at least one sympathetic error;
    performing the determined at least one sympathetic event action to recover from the at least one sympathetic error represented by the at least one sympathetic event object providing the at least one sympathetic event action, wherein the first main cause and sympathetic event objects are generated for the detected main cause error at the device in order to perform recovery operations to address the detected main cause error;
    transmitting, by the system, information indicating the main cause error to a remote system having devices;
    generating, by the remote system, a second main cause event object for the transmitted main cause error, the second main cause event object comprising a remote main cause error; and
    analyzing, by the remote system, error data for the devices at the remote system to determine whether there is at least one sympathetic error at the devices in the remote system resulting from the remote main cause error.

2. The computer program product of claim 1, wherein the operations further comprise:
    using the first main cause event object to determine whether the main cause error represented by the first main cause event object is active, wherein the determining and the performing of the at least one sympathetic event action are performed in response to determining that the main cause error is active.

3. The computer program product of claim 2, wherein the using the first main cause event object to determine whether the main cause error is active comprises determining from the first main cause event object for the main cause error an active function pointer; and
    executing the active function pointer to check state information in the system or at least one of the devices in the system to determine whether the main cause error is active.

4. The computer program product of claim 1, wherein the operations further comprise:
    indicating the main cause error as active in persistent information in the system; and
    generating sympathetic event objects for sympathetic errors resulting from the main cause error indicated in the persistent information as active.

5. The computer program product of claim 1, wherein the operations further comprise:
    indicating the first main cause event object as inactive in response to determining that system and device state information indicates that the main cause error represented by the first main cause event object is not present.

6. The computer program product of claim 1, wherein the operations further comprise:
    generating at least one sympathetic event object for the determined at least one sympathetic error at the devices in the remote system indicating a sympathetic event action;
    determining, at the remote system, at least one sympathetic event action to perform for the at least one sympathetic error in the remote system resulting from the remote main cause error; and
    performing the determined at least one sympathetic event action at the remote system.

7. The computer program product of claim 6, wherein the operations further comprise:
    receiving, by the remote system, indication that the remote main cause error is inactive; and
    indicating, by the remote system, the remote main cause event error as inactive.

8. The computer program product of claim 1, wherein the first main cause event object indicates at least one sympathetic event object for at least one sympathetic error at the device causing the main cause error.

9. The computer program product of claim 8, wherein the first main cause event object indicates at least one sympathetic event object for at least one sympathetic error for at least one device that does not cause the main cause error.

10. The computer program product of claim 8, wherein at least one device that does not cause the main cause error having the at least one sympathetic error comprises at least one of a redundant partner device providing redundancy for the device having the main cause error and a device comprising a child device to the device having the main cause error.

11. The computer program product of claim 1, wherein the at least one sympathetic event action comprises either a cancel of the at least one sympathetic event object or performing operations in the system to recover from the at least one sympathetic error represented by the at least one sympathetic event object.

12. The computer program product of claim 11, wherein the operations performed in the system for the at least one sympathetic event action comprises at least one of setting system flags, resetting system flags, and calling a sympathetic event handler function.

13. A system having devices, comprising:
   a first system, comprising:
      a processor; and
      a computer readable storage medium having code executed by the processor to perform operations, the operations comprising:
      analyzing error data for the devices in the first system to determine a detected main cause error for one of the devices that causes at least one sympathetic error in the system;
      generating a first main cause event object for the determined main cause error;
      generating at least one sympathetic event object for the determined at least one sympathetic error resulting from the main cause error, wherein the at least one sympathetic event object indicates a sympathetic event action to perform for the sympathetic error represented by the sympathetic event object;
      determining from the at least one sympathetic event object at least one sympathetic event action to perform for the at least one sympathetic error;
      performing the determined at least one sympathetic event action to recover from the at least one sympathetic error represented by the at least one sympathetic event object providing the at least one sympathetic event action, wherein the first main cause event object and the at least one sympathetic event objects are generated for the detected main cause error at the device in order to perform recovery operations to address the detected main cause error;
   a second system in communication with the first system;
   wherein the first system transmits information indicating the main cause error to the second system having devices;
   wherein the second system performs operations, the operations comprising:
      generating a second main cause event object for the transmitted main cause error, the second main cause event object comprising a remote main cause error to the second system; and
      analyzing error data for the devices at the second system to determine whether there are sympathetic errors at the devices in the second system resulting from the remote main cause error.

14. The system of claim 13, wherein the operations further comprise:
   using the first main cause event object to determine whether the main cause error represented by the first main cause event object is active, wherein the determining and the performing of the at least one sympathetic event action are performed in response to determining that the main cause error is active.

15. The system of claim 14, wherein the using the first main cause event object to determine whether the main cause error is active comprises determining from the first main cause event object for the main cause error an active function pointer; and
   executing the active function pointer to check state information in the first system or at least one of the devices in the first system to determine whether the main cause error is active.

16. The system of claim 13, wherein the operations further comprise:
   indicating the main cause error as active in persistent information in the first system; and
   generating sympathetic event objects for sympathetic errors resulting from the main cause error indicated in the persistent information as active.

17. The system of claim 13, wherein the processor and computer readable storage are part of a first system, further comprising:
   generating at least one sympathetic event object for the determined at least one sympathetic error at the devices in the second system indicating a sympathetic event action;
   determining at least one sympathetic event action to perform for the at least one sympathetic error in the second system resulting from the remote main cause error; and
   performing the determined at least one sympathetic event action at the second system.

18. The system of claim 17, wherein the operations further comprise:
   receiving, by the second system, indication that the remote main cause error is inactive; and
   indicating, by the second system, the remote main cause event error as inactive.

19. The system of claim 13, wherein the first main cause event object indicates at least one sympathetic event object for at least one sympathetic error at the device causing the main cause error.

20. The system of claim 19, wherein the first main cause event object indicates at least one sympathetic event object for at least one sympathetic error for at least one device that does not cause the main cause error.

21. The system of claim 19, wherein at least one device that does not cause the main cause error having the at least one sympathetic error comprises at least one of a redundant partner device providing redundancy for the device having the main cause error and a device comprising a child device to the device having the main cause error.

22. The system of claim 13, wherein the at least one sympathetic event action comprises either a cancel of the determined sympathetic event object or performing operations in the first system to recover from the at least one sympathetic error represented by the sympathetic event object.

23. The system of claim 22, wherein the operations performed in the first system for the at least one sympathetic event action comprises at least one of setting system flags, resetting system flags, and calling a sympathetic event handler function.

24. The system of claim 13, wherein the operations further comprise:
   indicating the first main cause event object as inactive in response to determining that first system and device state information indicate that the main cause error represented by the first main cause event object is not present.

* * * * *